United States Patent
Kowalevich et al.

(10) Patent No.: US 11,148,910 B1
(45) Date of Patent: Oct. 19, 2021

(54) REMOTE RELEASE SHACKLE FOR CHOKER HITCH

(71) Applicants: Peter Kowalevich, Ronkonkoma, NY (US); Melissa Kowalevich, Ronkonkoma, NY (US)

(72) Inventors: Peter Kowalevich, Ronkonkoma, NY (US); Melissa Kowalevich, Ronkonkoma, NY (US)

( * ) Notice: Subject to any disclaimer, the term of this patent is extended or adjusted under 35 U.S.C. 154(b) by 13 days.

(21) Appl. No.: 16/673,606

(22) Filed: Nov. 4, 2019

Related U.S. Application Data

(60) Provisional application No. 62/755,442, filed on Nov. 3, 2018.

(51) Int. Cl.
*B66C 1/18* (2006.01)

(52) U.S. Cl.
CPC ...................... *B66C 1/18* (2013.01)

(58) Field of Classification Search
CPC .. B66C 1/18; B66C 1/12; B66C 1/125; B66C 1/14; B66C 1/30; B66C 1/34; B66C 1/66; F16G 11/14; F16G 11/143
USPC ..... 294/82.14, 82.1, 82.11, 82.24; 24/136 K, 24/115 R
See application file for complete search history.

(56) References Cited

U.S. PATENT DOCUMENTS

| | | | | | |
|---|---|---|---|---|---|
| 2,058,243 | A | * | 10/1936 | Lippincott | B29C 53/562 242/528 |
| 2,729,126 | A | * | 1/1956 | Stanton, Jr. | B25B 5/163 269/137 |
| 2,845,828 | A | * | 8/1958 | Thomeczek | B25B 5/163 82/148 |
| 4,525,007 | A | * | 6/1985 | Chapalain | B66C 1/18 294/74 |
| 4,850,630 | A | * | 7/1989 | Davies | B25B 5/101 294/103.1 |
| 4,993,769 | A | * | 2/1991 | Chapalain | B66C 1/18 294/74 |
| 5,016,325 | A | * | 5/1991 | Rasmussen | B66C 1/18 24/68 CD |
| 5,836,631 | A | * | 11/1998 | Coe | B66C 1/18 294/74 |
| 7,614,209 | B1 | * | 11/2009 | Payne | F16G 15/06 59/86 |
| 2002/0195830 | A1 | * | 12/2002 | Gotz | B66C 1/18 294/82.11 |

(Continued)

*Primary Examiner* — Paul T Chin
(74) *Attorney, Agent, or Firm* — Betsy Kingsbury Dowd, Esq.; BKDowd Law, P.C.

(57) ABSTRACT

A shackle for a choker hitch includes a shackle body having a first end portion and a second end portion, a stabilizer portion positioned therebetween, a first leg and a second leg fixedly spaced apart by, and connected to, the stabilizer. The body includes a load-facing surface with a gripping surface extending from the first to the second end portion. A rod is removably positioned across the first end portion, and rigidly and removably connects the first leg to the second leg at the first end portion. A remotely releasable pin device includes a pin removably positioned across the second end portion and releasably connecting the first leg to the second leg at the second end portion. The load-facing surface may be curved or flat. The pin may be at 90 degrees for horizontal lifts, or less, e.g., 80 degrees, to the shackle body for vertical lifts.

19 Claims, 7 Drawing Sheets

(56) References Cited

U.S. PATENT DOCUMENTS

| | | | | |
|---|---|---|---|---|
| 2004/0232716 A1* | 11/2004 | Reed | ............... | B25J 15/00 294/86.4 |
| 2016/0136820 A1* | 5/2016 | Lessing | ............... | B25J 15/12 294/208 |
| 2019/0002247 A1* | 1/2019 | Kim | ............... | F16G 17/00 |

* cited by examiner

REMOTE RELEASE SHACKLE FOR CHOKER HITCH

CROSS-REFERENCE TO RELATED APPLICATION

The present disclosure claims priority to U.S. Provisional Patent Ser. No. 62/755,442, filed on Nov. 3, 2018, entitled REMOTE RELEASE SHACKLE FOR CHOKER HITCH, the entirety of which is incorporated herein by reference.

FIELD OF DISCLOSURE

The present disclosure relates generally to shackles for lifting loads and, in particular, to shackles for lifting loads using a choker hitch.

BACKGROUND

Various configurations of ropes and hooks are known for attaching to hoisting equipment for lifting and moving a load. Referring to FIG. 1, one configuration uses a double-eyed sling 12 with a first eye 14 at an upper end portion of the sling 12 being connected to the hoisting equipment, and a second eye 16 at a lower end portion of the sling 12 used to form a choker hitch around a vertical load 18. As shown in FIG. 1, to form the choker hitch, a release pin 22 of the shackle 20 is inserted through the second eye 16 to close the open end of the shackle 20 when in use for lifting the load 18. To release the load 18 from the choker hitch shown in FIG. 1, the pin 22 must be manually removed.

This conventional use of shackles for choker hitches undesirably requires the manual release of the pin 22, which places the worker tasked with removing it in a dangerous position. In this configuration, the worker is required to climb or walk on surrounding beams to gain access to the pin 22 to release the load. It is desirable, therefore, to increase site safety and reduce down time by constructing a shackle with a remotely releasable pin configuration, so that the pin and load can be released while the worker is standing on the ground and safely away from the load. It is also desirable to further reduce down time by providing a shackle that simplifies the rigging of a load for lifting. Currently, there is no known remote release shackle for a choker hitch that can be safely and quickly attached to a load with a pin that can be safely and quickly removed for releasing the load, and which is configured for either a vertical or horizontal lift.

Accordingly, there is a need for a remote release shackle for a choker hitch configured to safely and quickly lift and release a load that is either vertically or horizontally disposed.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a remote release shackle for a choker hitch configured to safely and quickly lift and release a load, which can be either vertically or horizontally disposed.

The present disclosure is also directed to a shackle for a choker hitch, the shackle including a shackle body having a first end portion and a second end portion, a stabilizer portion positioned between the first end portion and the second end portion, and a first leg and a second leg fixedly spaced apart by the stabilizer. The stabilizer is connectedly positioned between the first leg and the second leg. The shackle body further includes a load-facing surface extending from the first end portion to the second end portion. The load-facing surface is formed from at least a portion of an outer side surface of one or more of the first leg, the second leg, and the stabilizer. The load-facing surface includes a gripping surface configured to grip a load. The first leg includes a front mounting surface.

The shackle also includes a rod removably positioned across the first end portion, which rigidly and removably connects the first leg to the second leg at the first end portion; and a remotely releasable pin device, which includes a pin removably positioned across the second end portion of the shackle body and releasably connecting the first leg to the second leg at the second end portion.

In aspects, the gripping surface can be formed from a rubber pad adhered to the load-facing surface.

In other aspects, the gripping surface can be formed from gripping tape adhered to the load-facing surface.

In still other aspects, the load-facing surface is textured to form the gripping surface.

In additional aspects, the load-facing surface is curved to conform to a curved load. In aspects, the load-facing surface may be concave.

In aspects, the first leg may have one or more bores or through-holes, for one or both of the rod and pin to be removably positioned therethrough from the front mounting surface of the first leg.

In one aspect, the first leg may include a bore through which the pin is removably positioned to extend to the second leg.

The remotely releasable pin device, in aspects, includes a pull-pin body mounted onto the front mounting surface, i.e., to the first leg, with the pull-pin body aligned and configured with the bore to removably position the pin through the bore to the second leg.

In aspects, a longitudinal axis of the shackle is defined along a length of the shackle body extending from the first end portion to the second end portion, and the front mounting surface defines a longitudinal plane of the shackle.

In some aspects, the pin is oriented substantially perpendicular to the longitudinal plane.

In aspects, the pin is oriented at an angle less than 90 degrees, in some aspects at an angle between about 75 degrees and about 85 degrees, and in further aspects at an angle of about 80 degrees to the longitudinal plane. In aspects, the pin is oriented at an angle less than 90 degrees, in some aspects at an angle between about 75 degrees and about 85 degrees, and in further aspects at an angle of about 80 degrees to the longitudinal plane along at least one of a vertical axis and the longitudinal axis.

In aspects, the pin is oriented at an angle less than 90 degrees, in some aspects at an angle between about 75 degrees and about 85 degrees, and in further aspects at an angle of about 80 degrees to the longitudinal plane along both of the vertical axis and the longitudinal axis.

In aspects, the shackle body is formed from one of a solid steel and a steel alloy.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the detailed description in conjunction with the accompanying drawings, which are briefly described below.

Figure 1:
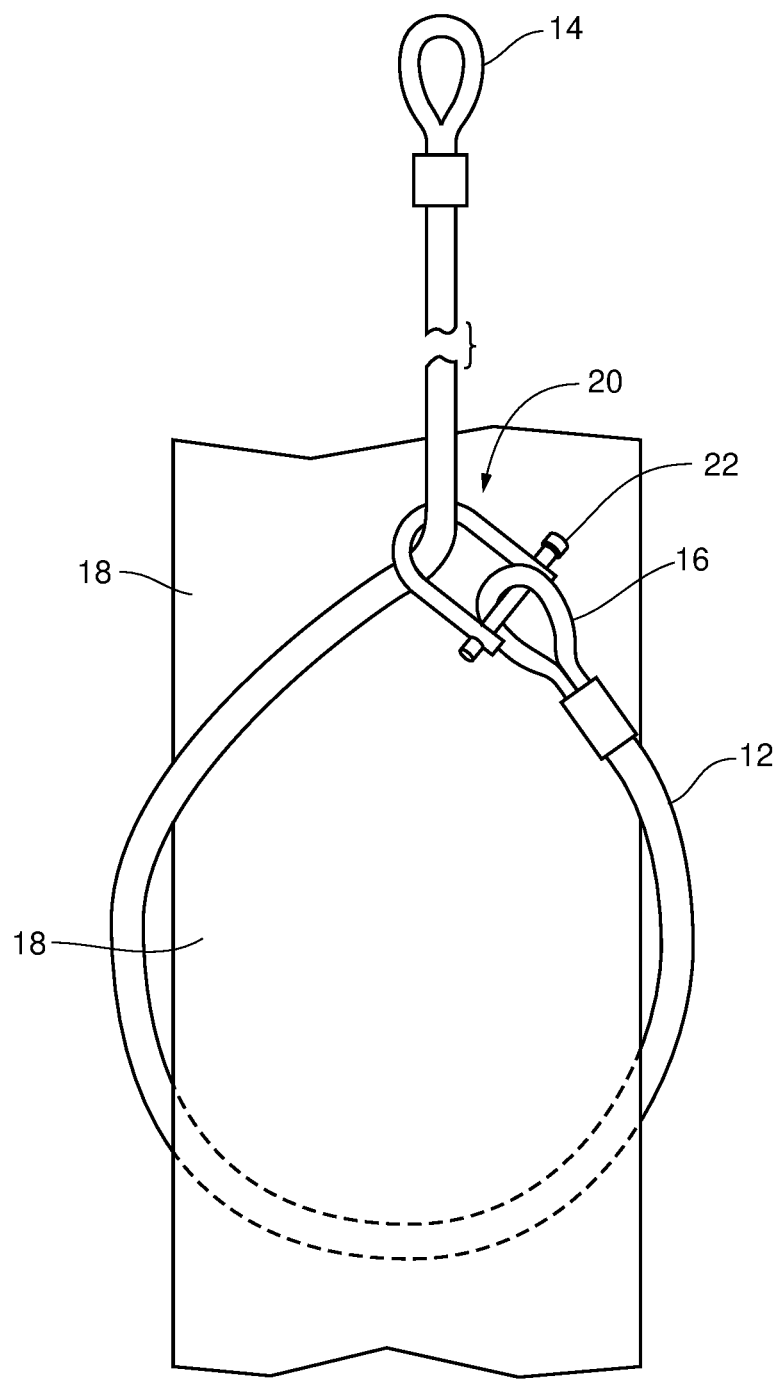
FIG. 1 is a pictorial representation of a prior art shackle and choker hitch which is rigged to lift a vertical load.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure of a shackle as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, it is contemplated that, additionally, there are items of the present disclosure that consist essentially of, or consist of, the one or more recited components or features.

The present disclosure is directed to a shackle for lifting loads using a choker hitch. The shackle is remotely releasable and is preferably configured for lifting both vertical and horizontal loads in an efficient and safe manner.

The term "sling" is used interchangeably with "choker" herein, as those terms are commonly used, to denote a rope, line, or other tether connecting hoisting equipment to a load for lifting and moving the load. The sling or choker of the disclosure may be formed of solid steel, steel alloys or other metal alloys of sufficient strength, or other suitable material of sufficient strength.

The term "choker hitch" is used generally, as commonly used, to refer to a sling configuration, with or without a shackle, that can "choke" or tighten around a load for lifting the load via the sling. The shackle of the present disclosure is configured to form a choker hitch with a sling, which is remotely releasable.

Referring to FIG. 1, a prior art shackle 20 for a choker hitch is typically U-shaped, the closed U-shaped end of the shackle 20 being used to slide the upper end of the sling 12 therethrough, so that the first eye 14 can be attached to hoisting equipment. For lifting the load 18, the lower end of the sling 12 is wrapped around the load 18, and pin 22, which is conventionally a screw-pin, is positioned through the second eye 16 and fixed firmly across the open end of the U to form a closed position of the shackle 20. The sling 12 encircling the load 18 and sliding through the closed U-shaped end of the shackle 20, together with the eye 16 of the sling 12 when rigged and captured by the pin 22, forms a choker hitch for vertically lifting the load 18. The load 18 is released when desired by sliding the pin 22 outwardly from its closed position, until it no longer encircles the second eye 16. In this prior art choker hitch, the shackle 20 and sometimes the pin 22 may be free to dangerously drop to the ground with the release of the load.

Figure 2:
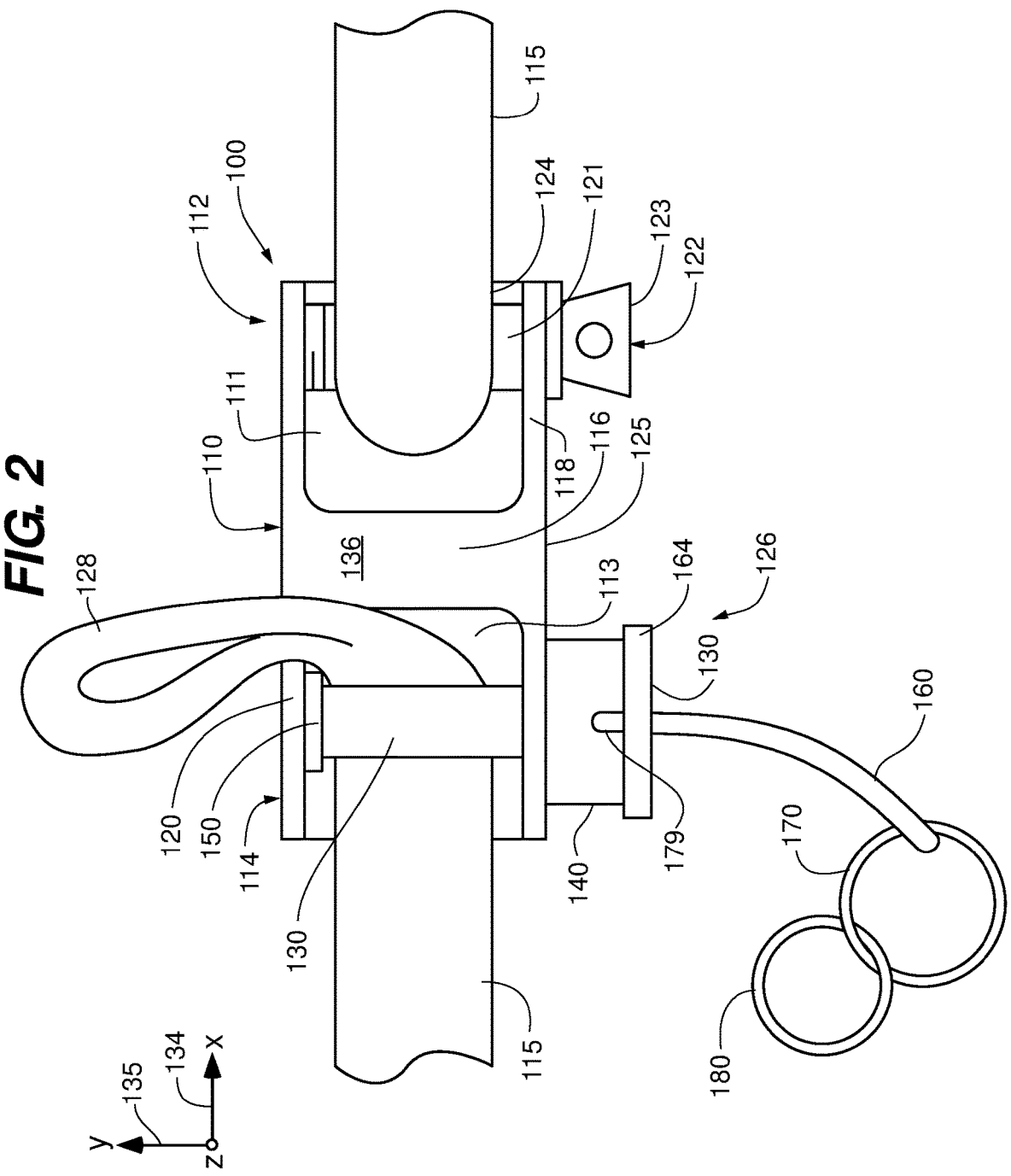
FIG. 2 is a pictorial representation of a top view of an embodiment of a shackle for a choker hitch of the present disclosure, shown in a closed position with a choker rigged for connecting a load to hoisting equipment.
Figure 3:
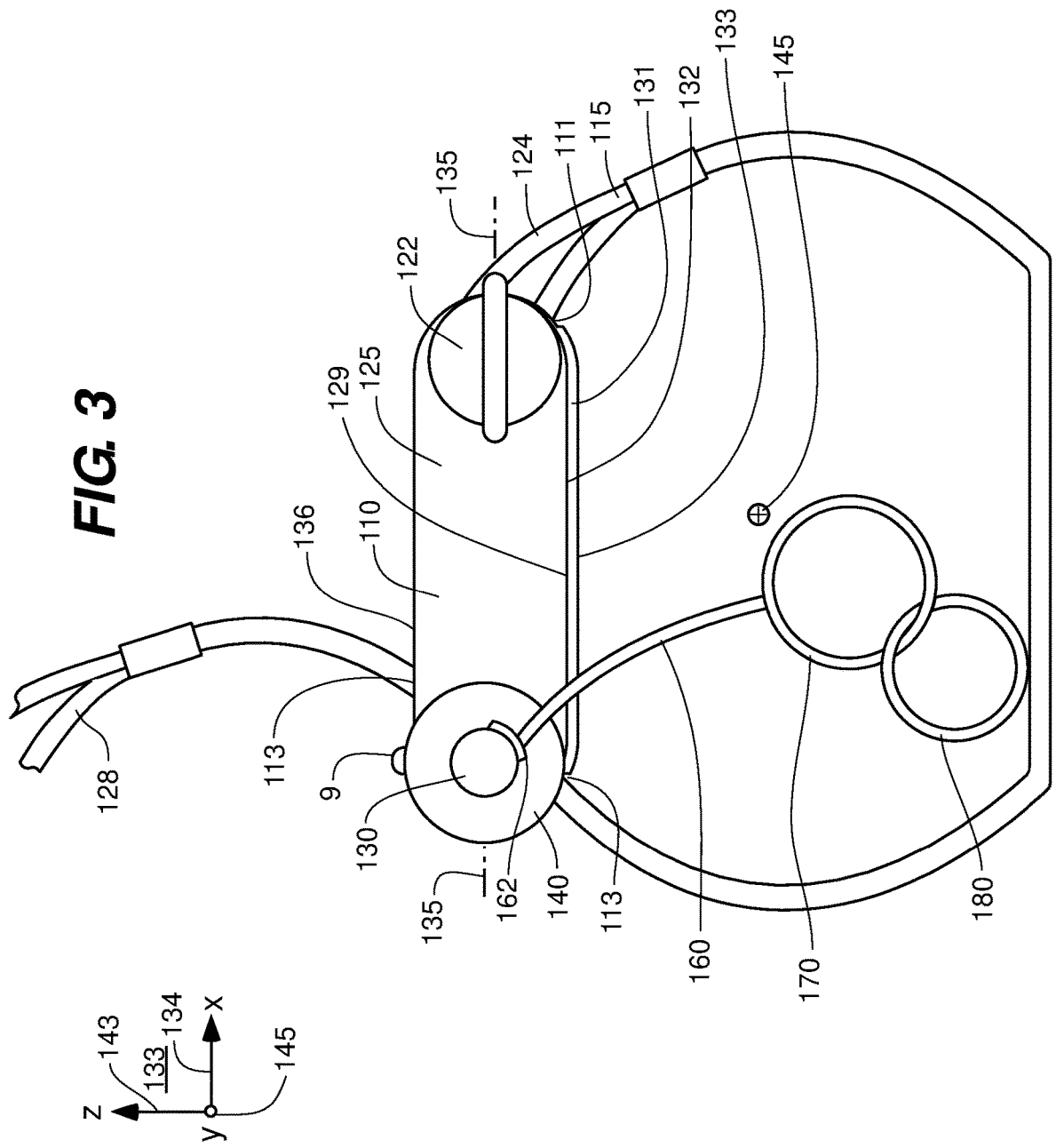
FIG. 3 is a pictorial representation of a front mounting-side view of the shackle of FIG. 2 rigged for lifting a horizontal load.
Figure 4:
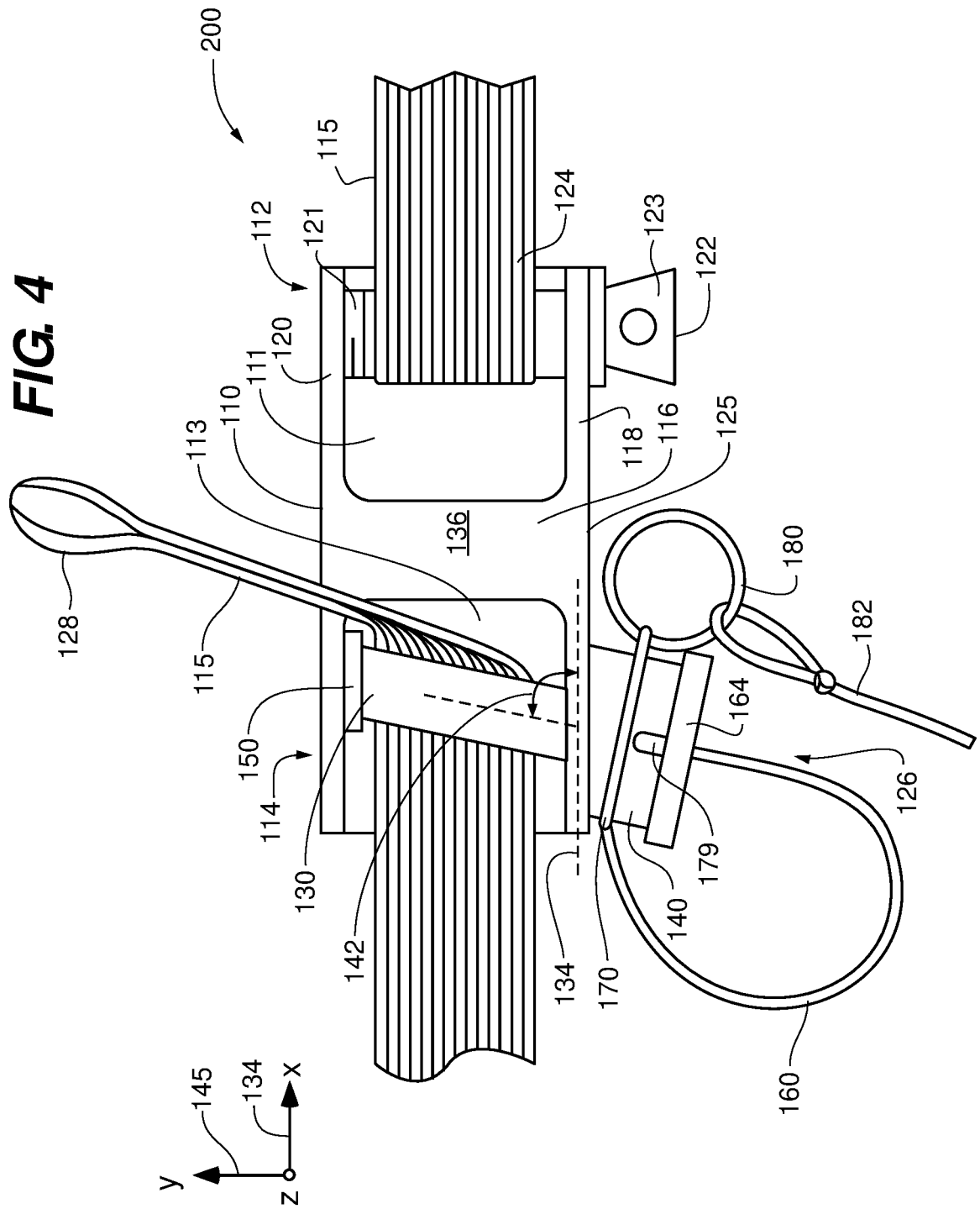
FIG. 4 is a pictorial representation of a top view of another embodiment of a shackle for a choker hitch of the present disclosure, shown in a closed position with a choker rigged for connecting a load to hoisting equipment.

Referring to FIGS. 2, 3 and 4-7, embodiments of a shackle 100, 200 of the present disclosure, respectively, include a shackle body 110 having a first end portion 112 and a second end portion 114 and a stabilizer portion 116 between the first end portion 112 and the second end portion 114. The shackle body 110 is also formed with a first leg 118 and a second leg 120, each of which extends from the first end portion 112 to the end second portion 114, and are fixedly spaced apart by the stabilizer portion 116. As shown in FIGS. 2 and 4, the stabilizer portion 116 in embodiments may be perpendicularly oriented to each of the first 118 and the second leg 120.

At the first end portion 112, embodiments 100, 200 of the shackle include a retractable closing element 122, which includes a retractable rod 121.

In embodiments, the first leg 118 of the shackle 100 has a through-hole (not shown) for inserting the retractable rod 121 therethrough. In further embodiments, a mounting portion 123 of the retractable closing element 122 may be tightened against a front mounting surface 125 of the shackle body 110 to fix the retractable closing element 122 in a closed position, with the rod 121 inserted through a first eye 124 of a choker hitch and fixed to the second leg 120.

The retractable closing element 122, including retractable rod 121, is preferably formed of a rigid, strong material and constructed to be unbendable under the particular loads the shackle is rated for use in lifting. When in use for lifting a load, the retractable closing element 122 is positioned through the first eye 124 and extends across and between the first leg 118 and the second leg 120. When positioned in the closed position for rigging a load, as shown in FIGS. 2 and 4, the retractable closing element 122 forms a gap 111 between it and the stabilizer portion 116 at the first end portion 112. As one of skill in the art will appreciate, there is also open space on the outer side of the retractable rod 121 between a load-facing surface 132 and a top surface 136 to accommodate the sling 115.

In embodiments, the retractable closing element 122 is a retractable rod. In embodiments, the retractable closing element 122 is perpendicularly oriented to the first 118 and the second leg 120.

In one embodiment, the retractable closing element 122 is a screw-in pin, preferably formed of a rigid, strong material such as steel. The second leg 120 includes a threaded bore positioned and configured to threadedly engage with the screw-in pin.

In other embodiments, the retractable closing element 122 is a solid steel dowel with holes on either side for cotter pins.

Figure 7:
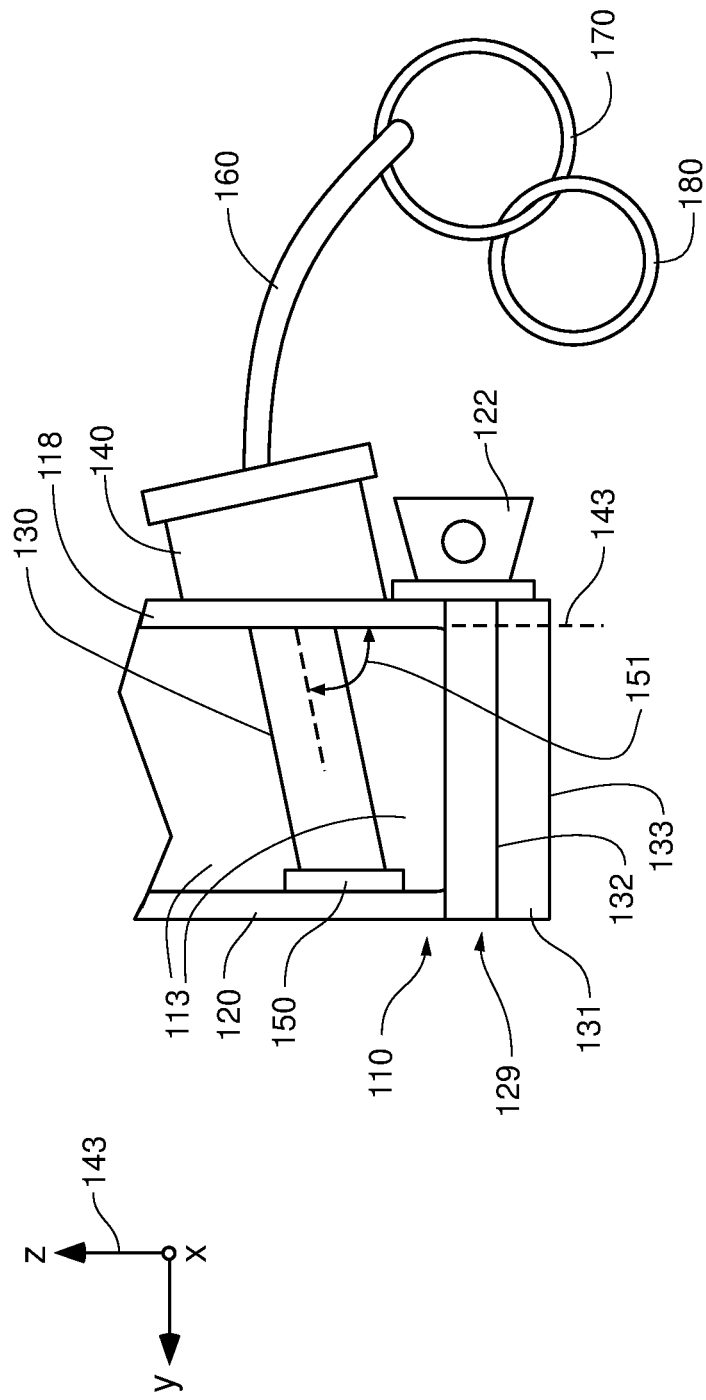
FIG. 7 is a pictorial representation of a left end view of lower portion of the shackle in a closed position of FIG. 4.

Referring for example to FIGS. 2 and 4, embodiments 100, 200 of the shackle may also include a remotely releasable pin device 126. The device 126 includes a pin 130 removably positioned across the second end portion 114 of the shackle body 110. The pin 130 releasably connects the first leg 118 to the second leg 120 at the second end portion 114 of the shackle body 110. In FIGS. 2, 4, and 7, the pin 130 is shown positioned in place for lifting a load, with an end portion of the sling 115 including a second eye 128 looped through opening 113 formed between the pin 130 and stabilizer 116 to hug and slide along an inner surface of the pin 130. The sling 115 is fed through the opening 113, and tightened in place around the load, and second eye 128 is connected to lifting equipment, via a lifting hook, for example, for lifting and moving the load.

Referring also to FIGS. 3 and 7, it should be recognized that when the pin 130 is moved away from the second leg portion 120 to release the load encircled by the sling 115, the shackle 100, 200 of the present disclosure remains attached to the sling 115 at the first eye 124, and the sling 115 along with the shackle 100, 200 remains connected to the hoisting equipment at the second eye 128. Unlike the prior art shackle of FIG. 1, embodiments 100, 200 of the shackle of the present disclosure, including the removable pin 130 (as further discussed below), does not fall freely with the load, and is easily recoverable for continued use.

It is also noted that prior art shackles with releasable pins that are attached as in FIG. 1, often utilize screw pins 22 to release the load, with one of the eyes 16 of the sling being captured by the releasable screw pin 22 as shown. The pins of these shackles can loosen by the turning or twisting of the load or when tightening the sling 12 around the load 18, causing a possible unwanted release of the load. In contrast, the shackle of the present invention feeds the sling 115 over an inner surface of the releasable pin 130, and the releasable pin 130 does not operate as a turn-screw, but is spring-loaded, as discussed further below. Accordingly, the releasable pin 130 of the shackle 100, 200 of the present disclosure does not suffer from inadvertent loosening.

Figure 6:
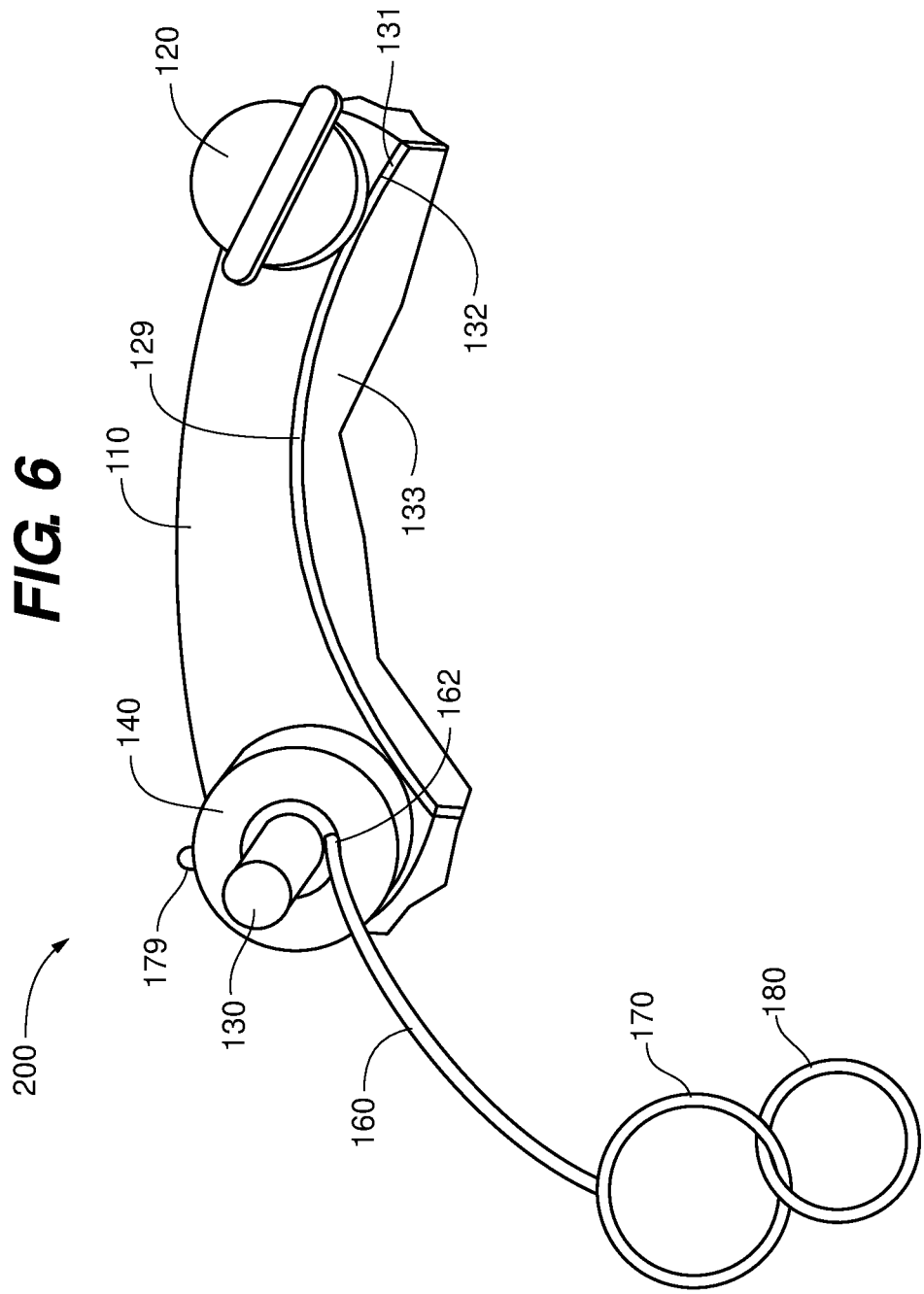
FIG. 6 is a pictorial representation of a perspective view from a front mounting-side of a portion of the shackle of FIGS. 4 and 5.

Referring again to FIG. 3 along with FIG. 6, the unique structure of the shackle body 110 is configured to advantageously provide a load-facing portion 129 having a load-facing surface 132 formed at least from side surfaces of both legs 118, 120, and also from a side surface of the broad stabilizer 116. In embodiments, as shown in the figures, the load-facing surface 132 is configured with a gripping surface 133 that forms a continuous surface extending between the first end portion 112 and the second end portion 114. The load-facing surface 132 via gripping surface 133 preferably forms a load-contacting surface that is substantially larger and more stable than that of prior art shackles, and which can snugly contact the load.

In embodiments, the load-facing surface 132 is configured to conform to the shape of a load. For example, in embodiments, the load-facing surface 132 can be flat to accommodate a load having a flattened side, including a rectangular-shaped load, as depicted by the shape of the sling 115 in FIG. 3, as it would appear when wrapped around a rectangular-shaped load.

In other embodiments, as shown, for example, in FIG. 6, the load-facing surface 132 can be curved or concave to accommodate a curved load, including, for example, a cylindrical load.

Whether a load is rigged for a vertical or a horizontal lift, the load will be gripped by the gripping surface 133 formed along the load-facing surface 132 so that the load is oriented at 90 degrees to the longitudinal plane 133 of the shackle body or to the front mounting surface 125.

The load-facing surface 132, in embodiments, is a gripping surface for better grip on a load.

In embodiments, a gripping material 131 is adhered to the load-facing surface 132 to form the gripping surface 133.

For example, the gripping surface 133 may be provided by gripping material 131 attached, e.g., by adhesive or any appropriate material, to the load-facing surface 132 of a load-facing portion 129 of the shackle body 110. 131 attached, e.g., by adhesive or any appropriate material, to a load-facing portion 129 of the shackle body 110.

In some embodiments, the gripping material is a rubber pad.

For example, the gripping surface 133 may be of rubber, and may be provided by rubber gripping material 131 in the form of a rubber pad heat-melted or adhered to the load-facing portion 129 of shackle body 110.

In other embodiments, the gripping material 131 is gripping tape.

The gripping tape is preferably adhered to the load-facing surface 132 of the load-facing portion 129 of the shackle body 110, the outer-facing side of the gripping tape providing the gripping surface 133 along load-facing surface 132.

In yet other embodiments, the load-facing surface 132 is textured to form the gripping surface, for example, by etching or other means known in the art.

In embodiments, referring to FIGS. 2 and 3, for example, the shackle body 110 is symmetric around a transverse (x-y) plane extending along a midline 135 or longitudinal axis (x-axis) 134 of the shackle body 110 from the first end portion 112 to the second end portion 114, which is, in embodiments, substantially parallel to the first 118 and second leg 120. In this embodiment, the load-facing surface 132 and a top surface 136, which is the surface of the shackle body 110 opposite the load-facing surface 132, may be substantially parallel and planar surfaces. The load-facing surface 132, in embodiments, includes at least a side surface of the first leg 118, the second leg 120, and the stabilizer portion 116.

In embodiments, the load-facing surface 132 is formed from at least a portion of a side surface of one or more of the first leg, the second leg, and the stabilizer.

In further embodiments, the load-facing surface 132 is a continuous surface which includes, and also extends between, the side surface of the first leg 118, the second leg 120, and the stabilizer portion 116 from the first end portion 122 to the second end portion 114.

Referring for example to FIGS. 2 and 4, in embodiments, the remotely releasable pin device 126 includes a pull-pin body 140 mounted onto the first leg 118 at the second end portion 114. The pull-pin body 140 is configured to lock the pin 130 in place between the first 118 and second leg 120 as well as to retract the pin 130 in order to release the load. It will be appreciated that in the embodiments shown in FIGS. 2,3 and FIGS. 4-7, wherein the pull-pin body 140 is mounted onto an outer surface (referred to as front mounting surface 125) of the shackle body 110, a bore (not shown) in the first leg 118 is aligned to allow the pin 130 to extend from the pull-pin body 140 through the first leg 118 and to the second leg 120.

In embodiments, the second leg 120 also may include a welded support portion 150 on an inner surface, positioned to accept and hold the pin 130 firmly in place in its closed position, when the shackle 100 is configured to lift a load. In embodiments of the shackle 200 in which the pin 130 is positioned at an angle less than 90 degrees, as shown in FIGS. 4-7, the welded support portion 150 is also preferably configured with a hole drilled to follow the angle of the pin to guide and securely accept the pin 130 therein.

In embodiments, the pull-pin body 140 can include a built-in spring-loaded and locking mechanism to position the remotely releasable pin in a closed position.

Figure 5:
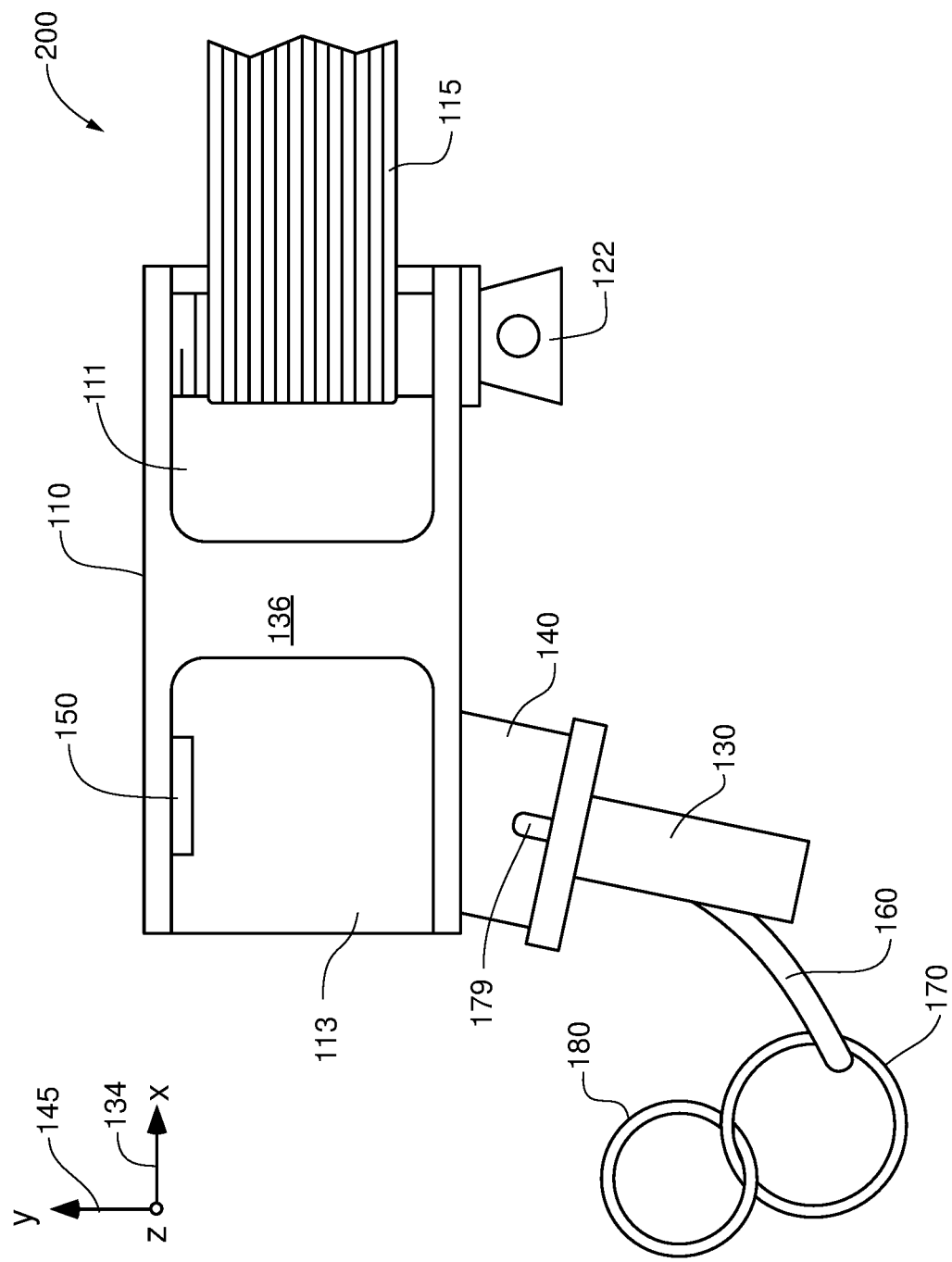
FIG. 5 is a pictorial representation of the top view of the shackle of FIG. 4 after releasing the load, or before securing the load.

In embodiments, the pull-pin body 140 is configured with a captured pin 130, which may be a captured spring-loaded pin 130, that is retained with the pull-pin body 140 and shackle 100, 200 when positioned into an open position, as shown in FIG. 5, to release a load.

As best shown in FIGS. 3 and 6, in embodiments, a wire-steel rope 160 may be connected to the pin 130 through opening 162 in the pull-pin body 140 to allow a worker to remotely pull the pin 130 into the open position.

Various additional safety features may be included with the remotely releasable pin device.

In embodiments, the pull-pin body 140 includes a retaining element 164 for retaining the pin 130 with the pull-pin body 140 during operation, while rigged with a load and after releasing the load, and during transport.

A safety ring 170 may be provided over the pull-pin body 140. In embodiments, an additional safety stop 179 may also be provided to hold the ring 170 in place while the load is in transport. These features are best shown in FIG. 4.

A ring 180 may also be included in embodiments to attach to a tie-off rope 182, as shown in FIG. 4, for remote (ground) release.

The sling 115 used for encircling and grabbing a load as described herein may be any suitable sling for lifting the desired loads.

In the embodiments shown in FIGS. 2 and 3, the sling 115 depicted is a five-eighths (⅝) inch wide steel choker which is shown rigged to grip a load being lifted.

The sling 115 may be formed of nylon. In embodiments, the sling is a one-inch nylon double-eye sling as depicted in FIGS. 4 and 5.

Referring to the shackle 100 shown in FIGS. 2 and 3, in embodiments, the pin 130 and pull-pin body 140 may be oriented at 90 degrees to the shackle body 110. For example, in embodiments, the pin 130 and pull-pin body 140 are oriented to removably position the pin, for both insertion and removal, along a direction perpendicular to the front mounting surface 125 or to the x-z plane 133 as shown (x-z plane 133 is in the plane of the paper of FIG. 3), also referred to herein as the longitudinal plane 133, of the shackle body 110 to releasably connect, or disconnect, the first leg 118 to the second leg 120. In this embodiment, the shackle 100 is well-suited for horizontal lifts. If needed, for longer loads and to enhance stability of the lift, one or more shackles 100 may be used, spaced side-by-side along the longitudinal axis 145 of the load.

In this embodiment, the pin 130 and pull-pin body 140 may be oriented at 90 degrees to the front mounting surface 125, which, in embodiments, is the outer-facing front planar surface of first leg 118, such that the pin is removed and inserted perpendicularly to the front mounting surface 125 of the shackle body, i.e., along the y-axis 145 as shown in FIGS. 2 and 3, which also corresponds to the direction of the longitudinal axis 145 of the load being lifted.

It will be appreciated that orthogonal coordinates have been added for convenient reference in the figures. Referring to FIGS. 2 and 3, for example, the y-axis 145 refers to a shackle body axis along its width, i.e., a transverse axis extending between the first 118 and second leg 120. The transverse or y-axis 145 of the shackle body coincides with the length or longitudinal axis of the load when the load is aligned to the load-facing surface, in both the embodiment of the shackle 100 for horizontal lifts of squared-off loads, and in the embodiment of the shackle 200 for vertical lifts of curved or cylindrical loads.

The transverse or y-axis 145 of the shackle body 110 of shackle 100 also coincides with the direction that the pin 130 is inserted and removed, that is, 90 degrees to the front mounting surface 125 or to the shackle body 110, as shown in FIGS. 2 and 3.

In the reference coordinate systems shown in the figures, the x-axis 134 refers to a shackle body axis along its length, i.e., a longitudinal axis 134 of the shackle body extending from the first end portion 112 to the second end portion 114. The x-axis 134 of the shackle body is transverse to the length (or longitudinal axis 145) of the load resting against the load-facing surface 132.

The z-axis 143 refers to a vertical axis relative to the x-y plane of the shackle body.

Embodiments of a shackle 100 of the present disclosure shown in FIGS. 2 and 3 may be configured with a flat load-facing surface 132 for squared-off loads or loads having at least one substantially planar surface which can be gripped against the load-facing surface 132.

Referring to FIGS. 4-7, additional embodiments 200 of a shackle of the present disclosure may be configured with a curved, or concave, load-facing surface 132 (see FIG. 6) to follow and grip the contour of a rounded load. For example, the load may be a caisson pile, which is a watertight retaining structure used for foundations of a building or bridge pier.

As also shown in FIGS. 4-7, in embodiments, the pin 130 and pull-pin body 140 may be oriented at an angle less than 90 degrees to the shackle body 110, i.e., to the longitudinal (x-z) plane 133, e.g., to front mounting surface 125, of the shackle body 110 to releasably connect the first leg 118 to the second leg 120. In embodiments, the pin 130 and pull-pin body 140 may be oriented at an angle less than 90 degrees to the shackle body 110, i.e., to the longitudinal (x-z) plane 133, along at least one of the z and the x-axis.

For example, in embodiments, the pin 130 and pull-pin body 140 are oriented to removably position the pin at an angle 142 less than 90 degrees to the longitudinal axis 134 of the shackle body 110, as best shown in FIG. 4. The angle 142 orients the pin 130 outward so that the pin is pulled in a direction away from the shackle body 110 and away from the y-axis, i.e., the longitudinal axis 145 of the load, to release the load.

Referring to FIGS. 6 and 7, in additional embodiments, the pin 130 and pull-pin body 140 may also be oriented to removably position the pin at an angle 151 that is less than 90 degrees to the vertical axis (z-axis) 143 of the shackle body 110 to releasably connect the first leg 118 to the second leg 120. Angle 151 positions the pin 130 such that it is pulled in an upward direction with the lift. The combination of angle 151 and angle 142 pulls the pin 130 both up and away from the load, i.e., upward and outward relative to the 90 degree position of the pin relative to the mounting surface 125 in the embodiment of FIGS. 2 and 3. This angled orientation of the pin 130 reduces the possibility of the shackle 100 rolling onto the load when used in a vertical lift like that shown in FIG. 1.

In embodiments, the pin 130 and pull-pin body 140 are oriented at an angle of less than 90 degrees to the front mounting surface 125, which, in embodiments, is the outer-facing front planar surface of first leg 118. In further embodiments, the pin 130 and pull-pin body 140 are oriented at less than 90 degrees to the front mounting surface 125 along both the longitudinal axis 134 and the vertical axis 143.

In additional embodiments, the pin 130 and pull-pin body 140 may be oriented at an angle between about 75 degrees and 85 degrees, and in further embodiments, at an angle of about 80 degrees to the longitudinal plane 133 of the shackle body 110. For example, in embodiments, the pin 130 and pull-pin body 140 are oriented to removably position the pin at an angle 142 of between about 75 degrees and 85 degrees, and in further embodiments, at an angle of about 80 degrees to the longitudinal axis 134 of the shackle body 110 to releasably connect the first leg 118 to the second leg 120.

In yet additional embodiments, the pin 130 and pull-pin body 140 in embodiments are oriented at an angle 142 of between about 75 degrees and 85 degrees, and in further embodiments, at an angle 142 of about 80 degrees to the longitudinal axis 134 of the front mounting surface 125, which, in embodiments, is the outer-facing front planar surface of first leg 118.

In embodiments, the pin 130 and the pull-pin body 140 are additionally oriented at an angle of between about 75 degrees and 85 degrees, and in further embodiments, at an angle of about 80 degrees to the load, which is grabbed by the load-facing surface 132. For example, the pin 130 and pull-pin body 140 may also be oriented to removably position the pin at an angle 151 that is between about 75 degrees and 85 degrees, and in further embodiments, at an angle of about 80 degrees to the vertical axis (z-axis) 143 of the shackle body 110 to releasably connect the first leg 118 to the second leg 120. Angle 151 positions the pin 130 such that it is pulled in an upward direction with the lift. The combination of angle 151 and angle 142 pulls the pin both up and away from the load.

Embodiments of the shackle including the pull-pin body 140 and direction of the released pin 130 at less than 90 degrees, e.g., at about 75 to about 85 degrees, or at about 80 degrees to the load and to the shackle body 110 or longitudinal x-z plane 133, advantageously minimize the possibility of the shackle 100 rolling onto the load, which is a problem that occurs with conventional shackles.

While any of the embodiments of the shackle of the present disclosure may be used, in operation, to pick up a vertically-oriented load (i.e., in a vertical lift), or a horizontally-oriented load (i.e., in a horizontal lift), the embodiments of the shackle 100 of FIGS. 2-3 with the pin 130 at 90 degrees to the shackle body are better suited for a horizontal lift. For a horizontal lift, two shackles of the present disclosure may be used, evenly spaced apart to grab the load. For vertical lifts, the embodiment of the shackle 200 of FIGS. 4-7 may be preferred.

The shackle of the present disclosure is ideal for lifting and placing beams on a higher elevation. The product eliminates potential hazards that accompany working at heights (e.g., at heights equal to or above six feet where tie-off is required). The obligation to wear a harness is also eliminated, because when using the shackle of the present disclosure the user can remotely release the load, e.g., the user can release the load from ground level. The shackle of the present disclosure also saves time on the job-site, as it excludes the need to climb or walk on surrounding beams, providing a quick, efficient solution, that results in real cost-savings to the business owner as well as improved safety conditions for the workers.

While particular embodiments of the present disclosure have been particularly shown and described with reference to specific embodiments, it should be apparent to those skilled in the art that the foregoing is illustrative only and not limiting, having been presented by way of example only. It is to be understood that the disclosed embodiments are merely examples of the disclosure, which may be embodied in various forms and detail without departing from the spirit and scope of the disclosure. Therefore, specific structural and functional details disclosed herein are not to be interpreted as limiting. Numerous other embodiments may fall within the scope of the accompanying claims and equivalents thereto.

What is claimed is:

1. A shackle for a choker hitch, the shackle comprising:
a shackle body having a first end portion and a second end portion, a stabilizer portion positioned between the first end portion and the second end portion, and a first leg and a second leg fixedly spaced apart by the stabilizer, wherein the stabilizer is connectedly positioned between the first leg and the second leg, and wherein the first leg includes a front mounting surface;
the shackle body further comprising a load-facing surface extending from the first end portion to the second end portion, the load-facing surface formed from at least a portion of an outer side surface of the first leg, the second leg, and the stabilizer, wherein the load-facing surface comprises a gripping surface for contacting and gripping a load, wherein the gripping surface is formed from gripping material adhered to the load-facing surface;
a rod removably positioned across the first end portion, the rod rigidly and removably connecting the first leg to the second leg at the first end portion; and
a remotely releasable pin device comprising a pin removably positioned across the second end portion of the shackle body and releasably connecting the first leg to the second leg at the second end portion.

2. The shackle of claim 1, wherein the gripping material is a rubber pad, the gripping surface being formed from the rubber pad adhered to the load-facing surface.

3. The shackle of claim 1, wherein the load-facing surface is concave to conform to a curved load.

4. The shackle of claim 1, wherein the first leg includes a bore through which the pin is removably positioned to extend to the second leg.

5. The shackle of claim 4, the front mounting surface configured for mounting and tightening a retractable closing element comprising the rod thereto, the first leg further comprising a through-hole through which the rod is retractably positioned to extend across the first end portion, and wherein the remotely releasable pin device includes a pull-pin body mounted onto the front mounting surface, the pull-pin body aligned and configured with the bore to removably position the pin through the bore to the second leg.

6. The shackle of claim 1, the remotely releasable pin device including a pull-pin body mounted to the first leg, the pull-pin body including a retaining element for retaining the pin with the pull-pin body during operation.

7. The shackle of claim 6, wherein the pin is a spring-loaded pin, the pull-pin body including a spring-loaded locking mechanism configured to position the pin in a closed position for lifting a load and to pull the pin into an open position for releasing a load.

8. The shackle of claim 1, a longitudinal axis of the shackle defining a direction along a length of the shackle body extending from the first end portion to the second end portion, and the front mounting surface defining a longitudinal plane of the shackle.

9. The shackle of claim 8, wherein the pin is oriented substantially perpendicular to the longitudinal plane.

10. The shackle of claim 8, wherein the pin is oriented at an angle less than 90 degrees to the longitudinal plane.

11. The shackle of claim 10, wherein the pin is oriented at an angle less than 90 degrees to the longitudinal plane along at least one of a vertical axis and the longitudinal axis.

12. The shackle of claim 11, wherein the angle is between about 75 degrees to about 85 degrees to the longitudinal plane of the shackle body along the at least one of the vertical axis and the longitudinal axis.

13. The shackle of claim 12, wherein the angle is between about 75 degrees to about 85 degrees along both the vertical axis and the longitudinal axis.

14. The shackle of claim 13, wherein the angle is about 80 degrees.

15. The shackle of claim 12, wherein the angle is about 80 degrees.

16. The shackle of claim 1, wherein the gripping material is gripping tape, the gripping surface being formed from the gripping tape adhered to the load-facing surface.

17. The shackle of claim 1, wherein the shackle body is formed from one of a solid steel and a steel alloy.

18. A shackle and choker assembly for tightening a choker around a load for lifting,
the choker comprising a first end portion configured for attaching to hoisting equipment, a second end portion comprising an eye, and a sling portion connecting the first end portion to the second end portion and configured for encircling a load;
the shackle comprising:
a shackle body having a first end portion and a second end portion, a stabilizer portion positioned between the first end portion and the second end portion, and a first leg and a second leg fixedly spaced apart by the stabilizer, wherein the stabilizer is connectedly positioned between the first leg and the second leg, and wherein the first leg includes a front mounting surface;
the shackle body further comprising a load-facing surface extending from the first end portion to the second end portion, the load-facing surface formed from at least a portion of an outer side surface of the first leg, the second leg, and the stabilizer;
a rod removably positioned across the first end portion, the rod rigidly and removably connecting the first leg to the second leg at the first end portion; and
a remotely releasable pin device comprising a pin removably positioned across the second end portion of the shackle body and releasably connecting the first leg to the second leg in a closed position at the second end portion, wherein an opening is formed between the pin in the closed position and the stabilizer;
wherein the rod is positioned through the eye of the choker to capture the choker on the shackle, the sling portion of the choker connectedly hanging from the eye of the choker, and wherein the first end portion is looped upward through the opening between the pin in the closed position and the stabilizer.

19. The shackle and choker assembly of claim 18, wherein the load-facing surface comprises a gripping surface formed from gripping material adhered to the load-facing surface for contacting and gripping a load.

* * * * *